Patented Nov. 2, 1943

2,333,403

UNITED STATES PATENT OFFICE 2,333,403

PROCESS FOR MAKING PLASTIC POLYMERIC MATERIALS WHICH COMPRISES POLYMERIZING BUTADIENE IN THE PRESENCE OF SELENIUM OR TELLURIUM AND PRODUCT SO MADE

Mortimer A. Youker, Gordon Heights, Del., assignor to E. I. du Pont de Nemours & Company, Wilmington, Del., a corporation of Delaware No Drawing. Application August 3, 1940,
Serial No. 351,226

22 Claims. (Cl. 260—84.5)

This invention relates to rubber-like synthetic products. More particularly, it relates to the manufacture of plastic rubber-like products from butadiene hydrocarbons. Still more particularly, it relates to the polymerization and plasticization of butadiene hydrocarbons.

The polymerization of butadiene gives two technically important types of polymers with many of the properties of natural rubber. One type is made by polymerizing butadiene with another polymerizable substance, such as styrene or acrylic nitrile, in the form of an aqueous dispersion. When compounded and cured, many of these products are comparable with natural rubber in strength and elasticity and, in some instances, are superior to natural rubber in certain properties, for example, in resistance to the action of certain solvents. They all have the serious disadvantage, however, of being difficult to process and utilize. Thus, for example, they lack plasticity and tackiness, and, hence, are very difficult to mix with compounding ingredients by milling to form into sheets, tubes, etc., and to build up into composite articles such as tires. On the other hand, the second type of product, made by polymerizing butadiene in the presence of sodium, has better working properties, but, when cured, is inferior to natural rubber in almost all respects.

An object of this invention is the preparation, from butadiene hydrocarbons without the use of plasticizing agents, of plastic, soluble, easily processed polymers which may, however, be made still more plastic by the addition of suitable agents, if desired. Another object of the present invention is to make plastic and easily processed rubber-like products from butadiene hydrocarbons. A more specific object is to prepare, from these hydrocarbons, plastic rubber-like products having superior resistance in the vulcanized state to the action of petroleum hydrocarbons and the like. Another object is to prepare polymeric products of widely varying plasticities from these hydrocarbons, and to control the process so as to obtain a product of the desired plasticity. A further object is to plasticize polymers of butadiene and its homologues by a method which does not require extensive milling, which does not require the introduction of substances which must afterward be removed and which renders it practical for users to have available for use polymers of butadiene and its homologues which have a wider variety of degrees of plasticity. Other objects will appear hereinafter.

These objects have been accomplished by the discovery that plastic polymers of the desired characteristics may be obtained by polymerizing butadienes, with or without other polymerizable compounds, in aqueous emulsion in the presence of selenium or tellurium, or both. After polymerization, the plastic polymer then formed is isolated.

The varied embodiments of this invention are illustrated in the following examples. It should be understood, however, that these examples are intended to be illustrative only and are not intended to limit the scope of the invention.

The proportions of ingredients used are given in parts by weight. In each example, 100 parts of the polymerizable material (either the diene itself or a mixture of the diene with the number of parts of the other polymerizable material given in the table), the quantity of selenium, tellurium and other ingredients given in the table, 22 parts of carbon tetrachloride, and 0.5 part of benzoyl peroxide were dispersed in 127 parts of water containing 8 parts of C-cetyl betaine and 0.3 part of acetic acid and polymerized at 60° C. for 65 hours. The polymerization vessels consisted of long thick-walled glass tubes which were closed with rubber stoppers. Emulsification was produced by rotating each tube about a horizontal axis perpendicular to its length at about 35 revolutions per minute. The rotation was kept up throughout the polymerization. The resulting latex-like dispersions were coagulated with ethyl alcohol. In each example, the coagulum was dried by milling on a warm mill, 1 per cent of phenyl-beta-naphthylamine based on the dry weight being added as an antioxidant, and gave a plastic, easily milled polymer.

In these examples and throughout this application, whenever the term "plasticity number" is used, it refers to the thickness in thousandths of an inch of a sample 2.0 cc. in volume in the form of a cylinder one centimeter high (before compression) which has been heated to 80° C. for 15 minutes and then kept under a weight of 5 kilograms for 3 minutes at 80° C. Thus, the lower the "plasticity number," the greater is the plasticity. The term "regain" or "recovery," whenever hereinafter used, refers to the increase in thickness (in thousandths of an inch) of the compressed sample which takes place in one minute on removing the compressing weight and allowing the sample to return to room temperature.

Examples 2, 3, 6, and 7 are not part of the present invention, but are given in the table for purpose of comparison of the present invention with the prior art. The yield, based on the total amount of polymerizable material, is also given in the table.

Table

| Example No. | Se, Te etc. | Other polymerizable compounds | Yield | Plasticity No. | Recovery |
|---|---|---|---|---|---|
| | | | Percent | | |
| 1 | 2Se | None | 90 | 120 | 25 |
| 2 | 2S | None | 91 | 165 | 54 |
| 3 | None | None | 93 | 170 | 88 |
| 4 | 2Se | 33 parts methyl methacrylate | 97 | 120 | 25 |
| 5 | 2Te | 40 parts methyl chloracrylate | 85 | 138 | 9 |
| 6 | 2S | ......do.......... | 92 | 154 | 30 |
| 7 | None | ......do.......... | 93 | 173 | 127 |
| 8 | 2Se | ......do.......... | 87 | 120 | 5 |
| 9 | 2Te | 25 parts acrylic nitrile | 95 | 91 | 2 |
| 10 | Te+Se | ......do.......... | 95 | 110 | 7 |
| 11 | 2Se,½S | 25 parts styrene | 90 | 111 | 23 |

The present invention is much broader in scope than the above examples. The materials used at all points in the process, their relative proportions, and the physical conditions under which the process is carried out are all, in fact, subject to wide variation, as will be discussed below.

The butadiene used in the above examples was prepared by vapor phase catalytic dehydration of 1,3-butylene glycol. Other sources of butadiene may also be used, however, for example, butadiene obtained as a by-product in the cracking of petroleum distillates. The butadiene is preferably substantially pure. It may be obtained in this state of purity by any of the common methods, for example, by causing it to react with sulfur dioxide, freeing the resulting addition product from unreacted hydrocarbons, and regenerating the butadiene from the addition product.

Furthermore, instead of butadiene-1,3, the diene polymerized may be any butadiene hydrocarbon capable of giving a rubber-like polymer, or, in general, butadiene-1,3 and its homologues in which the substitution is on the middle carbon atoms. Other dienes which may be mentioned as being particularly suitable are isoprene, and dimethyl-2,3-butadiene-1,3. These butadiene hydrocarbons may be used individually or in admixture with each other, or with one or more other polymerizable unsaturated compounds, particularly polymerizable organic compounds containing at least 2 carbon atoms in an open chain joined by more than one bond or with one or more saturated or unsaturated compounds which are not polymerizable under the conditions used.

As examples of polymerizable unsaturated compounds of the above type there may be mentioned hydrocarbons such as styrene, pinene, camphene, monovinyl acetylene, and divinyl-acetylene, alcohols and their esters (either organic or inorganic), such as vinylethinyl alkyl carbinols, vinyl acetate, vinyl chloride, and tetramethallyl orthosilicate, aldehydes and ketones such as acrolein and methyl vinyl ketone, and acids and their derivatives such as acrylic, methacrylic, chloracrylic, and furyl acrylic acids, butyl acrylate, methyl methacrylate, methyl chlor-acrylate, furyl acrylate, acrylic amide, methacrylic urea, acrylic nitrile, methacrylic nitrile, dimethyl fumarate, and the natural drying oils, as well as still other types of unsaturated, polymerizable compounds such as vinyl phthalimide, vinyl ethyl sulfide, and particularly, halogen substituted dienes such as chloroprene.

The proportion and type of polymerizable unsaturated compound used along with the rubber-forming butadiene hydrocarbon have important effects upon the steps of the process and upon the properties of the resulting products. The use of acrylic and methacrylic nitriles, methyl methacrylate, methyl chloroacrylate, for example, along with the butadiene also increases the tensile strength, resistance to abrasion, and resistance to the absorption of hydrocarbons such as petroleum distillates, of the vulcanized polymers. The hydrocarbon resistance is especially marked in the case of the products made with the nitriles, particularly acrylic nitrile.

The present invention is applicable to mixtures of polymerizable compounds containing the butadiene hydrocarbon in any appreciable proportion, although, of course, the total effects obtained by the use of the selenium and tellurium will, in general, be small when the proportion of butadiene is small. The use of these agents with mixtures which give polymeric products containing at least 50 per cent of butadiene hydrocarbon is, therefore, preferred.

Although in many cases both the butadiene hydrocarbon and the other polymerizable compound or compounds are all substantially completely polymerized and are believed to form a so-called interpolymer, in which the ingredients are chemically combined in the same molecule, the present invention is not limited to those systems in which interpolymerization is believed to occur. Desirable effects may be obtained when the second polymerizable compound polymerizes independently of the butadiene or even when it does not polymerize at all. In this last case, the polymerizable compound plays the part of an inert solvent. A great variety of non-polymerizable compounds, such as inert solvents, oils, and softeners for the polymerizable compounds, for example, saturated, aliphatic and aromatic hydrocarbons, halogenated hydrocarbons, ketones, and esters may also be used in the polymerization and in general have the effect of giving products which, before undergoing the plasticization step, are somewhat more plastic than when no solvent is used. Some solvents have additional effects. For example, carbon disulfide increases the solubility of the selenium and tellurium and chlorinated hydrocarbons with more than one chlorine atom on the same carbon atom, particularly carbon tetrachloride, accelerate the polymerization. The use of carbon tetrachloride is a preferred feature of the present invention.

The polymerization may also be accelerated by the usual polymerization catalysts such as hydrogen peroxide, benzoyl peroxide, ammonium persulfate and sodium perborate, as well as by increasing the temperature, pressure, or concentration of emulsifying agent or by adjusting the hydrogen ion concentration or by the choice of emulsifying agent.

Any of the allotropic modifications of selenium and tellurium may be used although, of course, those having the greater solubility in the system are preferred. Because of the limited solubility of even the most soluble modifications, an excess of selenium and tellurium in finely divided form is used as in the examples. From 0.2 per cent to 2 per cent of the total polymerizable material is preferred and 2 per cent is especially preferred. It is sometimes advantageous to use selenium and tellurium together as in Example 10 or in admixture with sulfur as in Example 11. When sulfur is added, it is preferred to add from 0.2 per cent up to the maximum amount soluble in the non-aqueous phase.

Any emulsifying agent may be used which is capable of giving a permanent dispersion of the polymerizable materials. Since it is often advantageous to work in slightly acid dispersions, the most suitable emulsifying agents are those which give stable acid dispersions and which do not promote, to an undesirable extent, the hydrolysis of compounds such as esters and nitriles which may be present. It has been found that substituted ammonium or sulfonium salts containing long chain (12 or more carbon atoms) hydrocarbon groups are particularly suitable. In this class, a betaine with the long chain attached to the carbon atom, such as the C-cetyl betaine used in many of the above examples, is preferred, particularly when the polymerizable materials include an unsaturated nitrile. Other valuable members of the class are cetyl trimethyl ammonium bromide, cetyl methyl piperidinium methyl sulfate, $C_{16}H_{33}(CH_3)(C_5H_{11}=)N-O-SO_2-O-CH_3$ oleoamidoethyl dimethyl amine acetate, $C_{17}H_{33}CONHC_2H_4NH(C_2H_5)_2-OCOCH_3$ parastear amidophenyl trimethyl amine methyl sulfate, $C_{17}H_{35}CONHC_6H_4N(CH_3)_3-O-SO_2-O-CH_3$ and N-stearyl betaine,

Other types of dispersing agents may also be used, such as the soluble salts of sulfonic acids containing the naphthalene nucleus and of the sulfuric acid esters of long-chain aliphatic alcohols. It is often advantageous to use a mixture of two types of dispersing agents, such as a mixture of a betaine and one of the salts just discussed.

A 2 or 3 per cent solution of the agents in water is usually suitable for forming a good dispersion, but considerably stronger or weaker solutions, for example, from about 0.2 per cent to about 15 per cent may also be used. The preferred concentration of the emulsifying agent is from about 2 per cent to about 8 per cent. It is also possible to add more emulsifying agent during the course of the polymerization, if desired, either continuously or in one or more batches. The polymerization is conveniently carried out in a slightly acid dispersion as in the examples, but it should be understood that the dispersion may be either alkaline, neutral, or acid, provided that conditions are not such that the dispersion is interfered with or coagulation induced or that the unsaturated esters, nitriles, etc., are hydrolyzed to an undesirable extent.

It is possible to further vary the manner of applying the invention by varying the concentration of the dispersed phase in the emulsion. It has been found that small amounts of the emulsifying solution give thick emulsions which are difficult to maintain at the desired temperature, while large proportions of solution require inconveniently large reaction vessels and excessive amounts of coagulating agents, although it is possible to use such extreme concentration. It is to be understood, however, that the invention is not limited to the particular concentration of the dispersed phase used in the examples. Preferred conditions consist in the use of an amount, by weight, of dispersion medium which is equal to from about 100 per cent to about 200 per cent of the dispersed phase.

The dispersion may be made by any suitable method, such as agitation in a closed container as described in the above examples or passage through a centrifugal pump or similar device causing turbulent flow. It has been found that the best products are obtained if the dispersed phase is emulsified to form very fine particles. In polymerizing large quantities, it is usually most convenient to form the dispersion at low temperature and then introduce it into the vessel in which it is to be polymerized.

The polymerization may be carried out at any temperature from about 20 to about 100° C. or above. It has been found, however, that temperatures in the range between 30° C. and 70° C. are, in general, the most suitable. At lower temperatures, the polymerization is usually too slow while, at higher temperatures, more elaborate equipment is required to withstand the high pressure and certain properties of the product are adversely affected.

The polymerization is usually carried to substantial completion, although, if a polymer of greater plasticity is desired, only a portion of the polymerizable material may be polymerized in one step and the unpolymerized portion recovered. The emulsion polymerization disclosed herein may be carried out continuously by a method similar to that described for chloroprene by Starkweather and Collins in their copending application, Serial No. 156,518, filed July 30, 1937, or as described by Calcott and Starkweather in their copending application Serial No. 308,386, filed December 9, 1939.

The polymer dispersions may be coagulated by any of the known methods applicable to dispersions made with the particular dispersing agent employed. Ethyl alcohol is generally applicable to substituted ammonium salt dispersions. A more economical method is that disclosed in U. S. Patent No. 2,161,949, patented June 13, 1939, to Calcott and Youker, a preferred embodiment of which consists of first adding sodium chloride and then adding a 7 per cent solution of normal butyl alcohol in water. In this way, a rapid and complete coagulation is obtained with the use of only a small amount of alcohol. Coagulation may also be very advantageously brought about by the method disclosed in U. S. Patent No. 2,187,146, issued January 16, 1940, to Calcott and Starkweather. According to a preferred form of this method, an internally cooled drum, part of which dips into the dispersion, is rotated in such a manner that a thin layer of the dispersion is frozen thereon and maintained at the low temperature out of contact with the unfrozen dispersion for a time long enough to cause complete coagulation. The frozen layer is then removed from the drum and warmed. A continuous layer of coagulum results, which, because of its physical form, is readily washed and dried.

Although, in certain cases, there may be some reason for allowing the emulsifying agents to remain in the polymer after coagulation, it is generally preferable to remove substantially all of them before the final milling. This may be accomplished in any desired manner, for example, by washing the polymer with warm water on corrugated rolls, assisting the extraction, if it is desirable, by using a solvent which dissolves the emulsifying agent, but not the polymer such as alcohol, acetone, etc. Milling may bring about a sufficient drying of the polymer, but where this is not deemed satisfactory, the polymer may be additionally dried, for example, by passing it in contact with a current of warm air. Milling on a rubber mill also assists in removing volatile material from the polymer, but other means for effecting its removal are often resorted to, for example, as is disclosed in the U. S. Patent No. 2,187,146 to Calcott and Starkweather referred to above.

While emulsion polymerization has been described and is preferred, it is not essential, but the polymerization may be carried out in solution or in the absence of solvents (massive polymerization).

The latices prepared as described above may, in general, be used for all the various purposes for which natural latex may be used, although the stabilized latices, as indicated, have a broader field of utility and show advantages even within the field where unstabilized latices are satisfactory. Thus, these latices may be employed to produce thin-walled articles, or to impregnate or coat cloth, etc., or for the many other purposes for which natural latex is used. To this end they may be compounded, particularly when stabilized with an alcohol or a ketone as described above, and then cured to a strong elastic state resembling vulcanized rubber. The compounding and curing of the latices are sufficiently similar to the compounding and curing of natural rubber latices as to make it unnecessary to detail here their many variations.

In general, the plasticity, solubility, and ease of working of products of this invention are sufficient without further plasticizing and, in this respect, they are unexpectedly superior to polymers made in the presence of sulfur. In rare cases where extreme plasticity is desired, the plasticity, solubility, and ease of working may be further increased by incorporating in the polymers one or more compounds of the general formula R—S—R₁ where R is an alkyl, aryl, thiazyl, thiocarbamyl, xanthogenyl, thioxanthogenyl, aromatic acyl, or aromatic thioacyl group and $R_1$ is hydrogen, a base-forming radical, or a group represented by —$S_n$—R, in which $n$ is a whole number less than 4 and R is one of the groups represented by R above, and subjecting the resulting composition to conditions adapted to develop plastic properties. The scope of this general formula is illustrated by the specific compounds:

Thiobetanaphthol

Mercaptobenzo thiazol
Potassium hexamethylene dithiocarbamate
Diphenyl disulfide
Dibenzoyl disulfide
Tetramethyl thiuram disulfide
Dibenzothiazyl disulfide
Bis-carbomethoxyphenyl-tetra-sulfide
Bis-ethyl-thio-xanthogen
Bis-isopropyl-xanthogen
Octyl mercaptan
Paranithrothiophenol
Thiobenzoic acid
Mercapto dimethylbenzothiazol
Sodium dimethyl dithiocarbamate
Hexamethylene imine salt of hexamethylene dithiocarbamate
Piperidine salt of pentamethylene dithiocarbamate
Bis dinaphthoyl disulfide
Dipentamethylene thiuram tetrasulfide The plasticizing of polymers with compounds of this type is more fully disclosed in French Patent No. 853,479, the disclosure of which patent is incorporated herein by reference.

The compounding of the plastic products of this invention in general follows the principles used for natural rubber. Thus, the presence of an antioxidant of this class effective for natural rubber is important, especially since the synthetic materials, unlike the rubber, contain no natural antioxidant. The antioxidant may be incorporated into the dry product on a rubber mill or may be advantageously added in the form of a dispersion to the polymer dispersion before coagulation. A vulcanizing agent, such as sulfur chloride, selenium, etc., or its equivalent, is used to bring about vulcanization, along with an organic vulcanization accelerator and auxiliary agents such as zinc oxide and stearic acid. All or part of the vulcanizing agent and accelerator required for vulcanization may have already been added during the preparation of the plastic polymer. In general, all of the filling and reinforcing agents and pigments used for rubber may be used here. Carbon black is particularly useful for reinforcing. Other agents known in the rubber art for softening, stiffening, reodorizing, or for producing or altering other special properties may also be added.

The plasticized products of the present invention may be used in the rubber art for practically all the purposes for which natural rubber is used. Moreover, as a result of their plasticity, tackiness, and solubility in organic solvents, in the uncured state they can be handled with such greater facility and more cheaply in operations such as compounding, sheeting, plying, calendering, tubing, coating, and impregnating than any any previously described butadiene polymer with comparable physical properties in the vulcanized state. Another advantage of the plastic products of this invention over the corresponding butadiene polymers made in absence of selenium tellurium, or sulfur is their much greater ability to take up pigments such as carbon black without loss of working properties. Thus, 100 parts of polymer, made as in Example IV, was compounded on a rubber mill with 50 parts of channel black, 1 part of stearic acid, 5 parts of zinc oxide, 2 parts of sulfur, and 1 part of mercapto benzo thiazole. The stock was easily compounded and processed, and, when cured for 10 minutes at 130 C., gave a product of good strength and resiliency and high resistance to the action of hydrocarbon solvents. In addition to having most of the properties of natural rubber, many of the products of the present invention are much superior to natural rubber in many important respects. Thus, for example, as already discussed, many of them, particularly those made from mixtures of butadiene with derivatives of unsaturated acids, such as methyl methacrylate and, especially, acrylic nitrile, show, when vulcanized, a very much greater resistance to the swelling action of petroleum distillates than natural rubber.

It is apparent that many widely different embodiments of this invention may be made without departing from the spirit and scope thereof, and, therefore, it is not intended to be limited except as indicated in the appended claims.

I claim:
1. Process for making a plastic polymer of a compound of the formula

$$CH_2=CR-CR'=CH_2$$

wherein each of the radicals, R and R', is a member of the group consisting of hydrogen and methyl, which comprises polymerizing a compound of the above general formula in the presence of a member of the group consisting of selenium, tellurium and mixtures of these two elements.

2. Process for making a plastic polymer of a compound of the formula $$CH_2=CR-CR'=CH_2$$

wherein each of the radicals, R and R', is a member of the group consisting of hydrogen and methyl, which comprises emulsifying, in aqueous emulsion, a compound of the above general formula and polymerizing, in the presence of a member of the group consisting of selenium, tellurium and mixtures of these two elements, said compound while so emulsified.

3. Process for making a plastic polymer of a compound of the formula $$CH_2=CR-CR'=CH_2$$

wherein each of the radicals, R and R', is a member of the group consisting of hydrogen and methyl, which comprises emulsifying, in aqueous emulsion, a compound of the above general formula, polymerizing, in the presence of a member of the group consisting of selenium, tellurium and mixtures of these two elements, said compound while so emulsified, and coagulating the resulting plastic polymer.

4. Process for making a plastic polymer of butadiene-1,3 which comprises polymerizing butadiene-1,3 in the presence of a member of the group consisting of selenium, tellurium and mixtures of these two elements.

5. Process for making a plastic polymer of butadiene-1,3 which comprises emulsifying butadiene-1,3 in aqueous emulsion and polymerizing, in the presence of a member of the group consisting of selenium, tellurium and mixtures of these two elements, the butadiene while emulsified.

6. Process for making a plastic polymer of butadiene-1,3 which comprises emulsifying butadiene-1,3 in aqueous emulsion polymerizing, in the presence of a member of the group consisting of selenium, tellurium and mixtures of these two elements, the butadiene while emulsified, and coagulating the resulting plastic polymer.

7. Process for making a plastic, rubber-like polymeric material which comprises polymerizing a polymerizable material, a substantial portion of which is a compound of the formula $$CH_2=CR-CR'=CH_2$$

wherein each of the radicals, R and R', is a member of the group consisting of hydrogen and methyl, and in the presence of a member of the group consisting of selenium, tellurium and mixtures of these two elements.

8. Process for making a plastic, rubber-like polymeric material which comprises emulsifying a polymerizable material, a substantial portion of which is a compound of the formula $$CH_2=CR-CR'=CH_2$$

wherein each of the radicals, R and R', is a member of the group consisting of hydrogen and methyl, and polymerizing, in the presence of a member of the group consisting of selenium, tellurium and mixtures of these two elements, said mixture while so emulsified.

9. Process for making a plastic, rubber-like, polymeric material which comprises emulsifying a polymerizable material, a substantial portion of which is a compound of the formula $$CH_2=CR-CR'=CH_2$$

wherein each of the radicals, R and R', is a member of the group consisting of hydrogen and methyl, polymerizing, in the presence of a member of the group consisting of selenium, tellurium and mixtures of these two elements, said mixture while so emulsified, and coagulating the resulting plastic, rubber-like, polymeric material.

10. Process for making a plastic, rubber-like, polymeric material which comprises polymerizing a polymerizable material, a substantial portion of which is butadiene-1,3 in the presence of a member of the group consisting of selenium, tellurium and mixtures of these two elements.

11. Process for making a plastic, rubber-like, polymeric material which comprises emulsifying a polymerizable material, a substantial portion of which is butadiene-1,3, and polymerizing, in the presence of a member of the group consisting of selenium, tellurium, and mixtures of these two elements, the mixture while so emulsified.

12. Process for making a plastic, rubber-like, polymeric material which comprises emulsifying a polymerizable material, a substantial portion of which is butadiene-1,3, polymerizing, in the presence of a member of the group consisting of selenium, tellurium, and mixtures of these two elements, the mixture while so emulsified, and coagulating the resulting plastic, rubber-like, polymeric material.

13. Process for making a plastic, rubber-like, polymeric material which comprises a polymerizing butadiene-1,3 in the presence of styrene and in the presence of a member of the group consisting of selenium and tellurium and mixtures of these two elements.

14. Process for making a plastic, rubber-like, polymeric material which comprises polymerizing butadiene-1,3 in the presence of acrylic nitrile and in the presence of a member of the group consisting of selenium and tellurium and mixtures of these two elements.

15. Process for making a plastic, rubber-like, polymeric material which comprises polymerizing butadiene-1,3 in the presence of an ester of methacrylic acid and in the presence of a member of the group consisting of selenium and tellurium and mixtures of these two elements.

16. A plastic, rubber-like polymer of butadiene-1,3 made by polymerizing the polymeric material in the presence of a member of the group consisting of selenium, tellurium, and mixtures of these two elements.

17. A plastic, rubber-like material made by polymerizing a polymerizable material, a substantial portion of which is butadiene-1,3 in the presence of a member of the group consisting of selenium, tellurium, and mixtures of these two elements.

18. A plastic, rubber-like interpolymer of butadiene-1,3 and styrene made by polymerizing a polymerizable material consisting of butadiene-1,3 and styrene in the presence of a member of the group consisting of selenium, tellurium, and mixtures of these two elements.

19. A plastic, rubber-like interpolymer of butadiene-1,3 and acrylic nitrile made by polymerizing a polymerizable material consisting of butadiene-1,3 and acrylic nitrile in the presence of a member of the group consisting of selenium, tellurium, and mixtures of these two elements.

20. A plastic, rubber-like interpolymer of butadiene-1,3 and an ester of methacrylic acid made by polymerizing a polymerizable material consisting of butadiene-1,3 and an ester of methacrylic acid in the presence of a member of the group consisting of selenium, tellurium, and mixtures of these two elements.

21. Process for making a plastic rubber-like polymeric material which comprises polymerizing butadiene-1,3 in the presence of a member of the group consisting of styrene, acrylic nitrile, and esters of methacrylic acid and in the presence of a member of the group consisting of selenium and tellurium and mixtures of these two elements.

22. A plastic rubber-like material made by polymerizing butadiene-1,3 in the presence of a member of the group consisting of styrene, acrylic nitrile, and esters of methacrylic acid and in the presence of a member of the group consisting of selenium and tellurium and mixtures of these two elements.

MORTIMER A. YOUKER.